United States Patent [19]

Sanchez et al.

[11] Patent Number: 5,102,850
[45] Date of Patent: Apr. 7, 1992

[54] CATALYST SUPPORTS HAVING PROMOTER OXIDE GRADIENT, RESULTING CATALYST AND METHOD OF MAKING THE SUPPORTS

[75] Inventors: Moises G. Sanchez, Severna Park; Stephen R. Schmidt, Silver Spring; Michael V. Ernest, Catonsville, all of Md.

[73] Assignee: W. R. Grace & Co. - Conn., New York, N.Y.

[21] Appl. No.: 600,374

[22] Filed: Oct. 17, 1990

[51] Int. Cl.$^5$ .................. B01J 21/06; B01J 23/10; B01J 23/58; B01J 23/64
[52] U.S. Cl. .................. 502/261; 502/302; 502/303; 502/304; 502/325; 502/328; 502/339; 502/439; 423/213.5
[58] Field of Search ............... 502/303, 304, 261, 302, 502/325, 328, 339, 439; 423/213.5

[56] References Cited

U.S. PATENT DOCUMENTS 4,136,063  1/1979  Kimura et al. ............. 502/331 X
4,374,047  2/1983  Bozon et al. ............. 502/339
4,591,580  5/1986  Kim et al. ............. 502/303

FOREIGN PATENT DOCUMENTS 63-25648  10/1988  Japan .
0156145  3/1989  Japan .

Primary Examiner—W. J. Shine
Attorney, Agent, or Firm—Edward J. Cabic

[57] ABSTRACT

Catalysts which are suitable for auto exhaust use are made with a promoter oxide that is deposited in a concentration gradient. A solution of the promoter oxide precursor, e.g., cerous nitrate solution, is impregnated uniformly into the pore structure of a support which can be in the form of beads or extrudates to a level just below the full incipient wetness. The impregnated support is then treated with a gaseous base such as ammonia, under dynamic conditions such as tumbling (to insure uniformity), which causes the precipitation of the promoter oxide in the form of a radial concentration gradient. The resulting product is then dried and calcined at sufficiently high temperature to effect complete conversion of the promoter precursor to its oxide form, e.g., $CeO_2$.

20 Claims, 4 Drawing Sheets

CATALYST SUPPORTS HAVING PROMOTER OXIDE GRADIENT, RESULTING CATALYST AND METHOD OF MAKING THE SUPPORTS

BACKGROUND OF THE INVENTION

1. Field of the Invention

This invention relates to a catalyst support which has a unique promoter oxide gradient distribution and which can be made into an auto exhaust catalyst.

2. Description of the Previously Published Art

U.S. Pat. No. 4,591,580 to G. Kim and M. V. Ernest discloses stabilized and doubly promoted auto exhaust catalysts. The alumina is stabilized with lanthana and then ceria ($CeO_2$) is added as one of the promoters in an amount of 1 to 20 wt %. The ceria is applied by spraying with a cerium salt such as cerium nitrate. Although the noble metals are applied with special metal concentration profiles, the ceria and second promoter are not applied with any unique profile.

Toyota Japanese Publication No. 01-56145 published Mar. 3, 1989, discloses a monolithic catalyst which has two ceria concentrations. At the opening end (i.e. the upstream end of the gas flow) the ceria concentration is 0.3-1.0 mol/l and in the downstream section the ceria concentration is less than 0.3 mol/l. The high ceria concentration at the beginning serves to store oxygen so that variances of exhaust gas makeup can be made nearly equal to that of theoretical air and fuel ratio. The downstream section has less ceria so the metal catalyst has ideal conditions to react with the exhaust gas. That disclosure is only pertinent to a monolith structure which has an upstream portion and a downstream portion.

Toyo Kogyo Japanese Publication No. 63-258648 published Oct. 26, 1988, discloses an auto exhaust catalyst where a honeycomb support of cordierite is immersed in two difference ceria solutions. The inlet end has the higher ceria concentration than the outlet end. The purpose of changing the ceria concentration from the level at the inlet end to the level at the outlet end is to have a uniform temperature distribution. Here again, this strategy is only effective for monoliths.

3. Objects of the Invention

It is an objection of this invention to improve the catalytic activity of supported noble metal catalysts.

It is a further object of this invention to improve the mechanical and catalytic durability of supported noble metal catalysts.

It is a further object of this invention to decrease the raw material usage and resulting costs of supported noble metal catalyst.

It is a further object of this invention to maintain existing activity and durability of supported noble metal catalysts by establishing a controlled gradient of catalytic promoter in the catalyst support.

It is a further object of this invention to produce a catalyst support having a promoter oxide and preferably a ceria gradient such that there is a large concentration of ceria at the outer region of the support such as sphere and a significantly lower concentration of the promoter oxide (e.g. ceria) in deeper positions within the sphere.

It is a further object of this invention to provide a support such as a sphere comprising a ceria gradient coupled with a controlled gradient of the noble metals will result in an improved catalyst.

It is a further object of this invention to provide a support such as a sphere comprising a ceria gradient which will result in a vastly improved attrition resistant catalyst.

These and further objects will become apparent as the description of the invention proceeds.

SUMMARY OF THE INVENTION

Particles of a refractory oxide support base such as alumina are used in the form of beads including spheres or nearly spherical particles or extrudates. A solution of the promoter oxide precursor, e.g., cerous nitrate solution is impregnated uniformly into the pore structure of the support to less than full incipient wetness. The impregnated support is then treated with a gaseous base such as ammonia, under dynamic conditions such as tumbling (to insure uniformity), which causes the precipitation of hydrous promoter oxide in the form of a radial concentration gradient. Variations of the promoter oxide such as cerium concentration and of the amount of excess acid in the promoter precursor solution, the relative rate of addition of the gaseous base, and the temperature during precipitation, etc. determine the nature of the promoter oxide gradient.

The resulting product is then dried and calcined at sufficiently high temperature to effect complete conversion of the promoter precursor to its oxide form, e.g., $CeO_2$.

The particulate support thus prepared is then impregnated with one or more platinum group noble metals and heat treated to form a catalyst which exhibits a double gradient, i.e., a promoter (or dispersing support) gradient and a noble metals gradient. The resulting catalyst particles have a higher concentration of noble metals near the particle surface where they are most effective, while maintaining catalytic stability and durability as well as mechanical integrity under use conditions such as attrition resistance.

DESCRIPTION OF THE PREFERRED EMBODIMENTS

The present invention creates a concentration gradient of a catalytic promoter oxide on a refractory oxide support for noble metal catalysts in order to maximize the promoter concentration in the outer periphery of the catalyst particles. This maximizes the attrition resistance of the catalyst particle, the dispersion of the noble metals and their catalytic activity, stability, and durability. The catalytic promoter oxides which can be used include $CeO_2$, or other metal dioxides such as $ZrO_2$, $HfO_2$, $TiO_2$, $SiO_2$, etc., as well as other oxides such as rare earth oxides, alkaline earth oxides and $Nb_2O_5$ and mixtures thereof. The $SiO_2$ would be used as a promoter oxide for nonsiliceous refractory oxides.

The concentration of the catalytic promoter is greatest at the surface and is lowest at or near the center. The relative decrease in concentration is at least about 25% from the surface down to about 50 microns below the surface. In a preferred embodiment the relative decrease in concentration is at least about 35% from the surface down to about 50 microns below the surface and the relative decrease in concentration is at least about 45% from the surface down to about 100 microns below the surface.

A further feature of the present invention is the unique process of incorporating the promoter into a particulate support. Specifically, the use of uniform impregnation by a solution of the promoter precursor, such as cerous nitrate, in combination with controlled precipitation upon treating with a gaseous base under dynamic (tumbling) conditions.

A relatively inert, refractory oxide particulate material serves as the catalyst support, i.e. the substrate onto which the promoter oxide gradient and subsequent dispersed noble metals are applied. These refractory oxides can include siliceous materials which include silica and silica-alumina materials. Preferably supports are predominantly composed of alumina, such as a gamma-type, theta or other transition alumina and may contain a rare earth oxide such as $La_2O_3$ incorporated uniformly throughout the particle to enhance its thermal stability against premature adverse phase transformations. This $La_2O_3$ can be deposited in an amount of about 0.1 to 5% by weight. In either case the refractory oxide such as alumina or alumina/rare earth oxide particle has a porous structure which must be dried thoroughly prior to application of the promoter (ceria) gradient. This is achieved by heating in air for a time/temperature combination sufficient to minimize measurable volatiles or conversely, maximize measurable (available) water pore volume. Using a standard "incipient wetness" method, the water pore volume of a small representative sample of the support is determined at this point. In subsequent impregnation steps the water pore volume is the basis for the proportion of solution volume to dry support weight used.

To create a gradient in the promoter oxide concentration such as cerium a two-step method is used. In a first step the cerium is applied to the support as a solution, and in a second step it is converted into a hydrous oxide precipitate which exhibits a radial gradient distribution by controlled neutralization with a gaseous base.

The properties of the promoter oxide solution such as a cerium are chosen preferably to the following criteria. The cerium is preferably in a soluble cerous salt form, e.g. cerous nitrate capable of remaining stable as a solution until reacted with the gaseous base. The pH of the cerous salt solution can be conveniently adjusted to approximately 3 using dilute ammonium hydroxide. The cerium concentration of the solution is set by the level of cerium desired in the final support and the water pore of the support. The relative solution volume (ml.) to be used per gram of support is set at slightly below the previously determined water pore volume (ml./g) or incipient wetness level, e.g. at a level below the full actual water pore volume such as at 90%. This technique is a compromise between economy of delivery, virtual completeness of impregnation of the support particles, and avoidance of flooding by excess liquid.

The cerium-containing solution is applied to the support particles as a fine spray through a pressurized nozzle. As the spray is applied, the support particles are kept in motion, e.g. in a rotating, tumbling bed for better uniformity of impregnation by the solution. Following complete delivery of the cerium solution the tumbling is maintained to ensure equilibration and uniform cerium distribution. Following this, while the beads are still tumbling, the gaseous base is delivered to the impregnation vessel via a tube or a spray nozzle similar to that with which the solution was applied. The total amount and rate of delivery of the base can be controlled over wide ranges in order to guarantee complete neutralization and precipitation of the cerium as a hydrous oxide within the porous structure and to set the sharpness of the gradient. Slow delivery of gaseous base produces very sharp cerium gradients while fast delivery tends to minimize the gradient.

Drying in air under mild conditions, followed by calcination at high temperature which ensures conversion of the cerium to the $Ce^{+4}$ state (as $CeO_2$), completes the preparation of the catalyst support.

The formed supports can be beads such as spheres or nearly spherical particles or extrudates. Preferably they are of a size of at least about 20 U.S. mesh designation in size but less than about ½ U.S. mesh designation in size and more preferably of a size of at least about 10 U.S. mesh designation in size but less than about 5 U.S. mesh designation in size.

The conversion of the above-described support to a finished auto emissions catalyst hereafter is not significantly different from that employed in making a typical non-gradient catalyst. Spray impregnation of noble metals followed by thermal treatments in both oxidizing and reducing atmospheres are the common features. The ceria gradient achieved in preparing the support eventually leads to a corresponding noble metals gradient as well.

The platinum group metal component may be platinum, palladium, rhodium, ruthenium, iridium, osmium, and mixtures thereof, with the preferred metals being Pt, Pd, and Rh either alone or in any combination. When the platinum group metal contains more than one of such metals, the mixture may be composed of a major amount of platinum or palladium and a minor amount of one or more of the other platinum group metals such as rhodium. When platinum and palladium are used as a binary mixture, they can be in any ratio. The catalytic metals mixture may comprise from 0 to about 20 wt. % rhodium, or mixtures thereof and preferably about 10 wt. % rhodium and about 90 wt. % platinum, palladium, or mixtures thereof.

Various compounds, complexes, or fine metal dispersions of any of the platinum group metals in an aqueous or an organic medium may be used to achieve deposition of the platinum group metal component on the composite. A suitable liquid medium will not react with the platinum group metal component and is removable on drying which can be accomplished as part of the preparation or during use of the catalyst. Water soluble platinum group metal compounds or complexes may conveniently be used. Suitable platinum group metal compounds include chloroplatinic acid, hexahydroxy platinic acid, potassium platinum chloride, ammonium platinum thiocyanate, platinum tetrammine chloride, palladium tetrammine chloride, sodium palladium chloride, hexammine rhodium chloride, and hexammine iridium chloride.

In a preferred embodiment of this invention, the impregnation solution contains sulfito complexes of platinum group metals, especially for platinum and palladium. For platinum and palladium, either an acid or an ammonium sulfito complex can be used. The most preferred platinum source is the ammonium sulfito complex prepared according to the methods described in U.S. Pat. No. 3,932,309 (Graham et al). The use of these complexes provides excellent dispersion and control of penetration depth of the platinum group metal. Rhodium can be incorporated in the catalyst by impregnation with an acid rhodium sulfito complex prepared by reacting rhodium trichloride or rhodium hydrous oxide with sulfurous acid. A rhodium nitrate solution can be substituted, in part, or entirely for an acid sulfito complex solution of rhodium.

In a preferred embodiment of this invention for full scale continuous production the pellets will be held for about two hours at room temperature after each impregnation is completed with the metal or metals. The composition may then be dried, for example, at a temperature of from about 100° C. to about 150° C. for about 2 to about 20 hours. The salt may be decomposed and the catalyst activated under conditions which provide a composition having characteristics that promote the desired reaction. The temperature of this activation is low enough t avoid either noble metal sintering or sintering of the support. It is preferably done in a reducing atmosphere, e.g., by about a 1 hour reduction in flowing nitrogen containing 5 volume percent hydrogen at about 250°-550° C. and more preferably at about 400° C. For the catalyst of this invention, the most preferred catalyst activation procedure is to treat in flowing $N_2$ containing 3-5 vol. % $H_2$ along with 20-50 vol. % steam at 550°-650° C.

In the catalyst of this invention, the platinum group metals provide the catalytically active surfaces for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.005 to 10 percent and is preferably about 0.01 to 2 percent based on the weight of the calcined composite to maintain good activity with prolonged use.

Having described the basic aspects of our invention, the following examples are given to illustrate specific embodiments thereof.

EXAMPLE 1

Comparison

This example describes a non-gradient catalyst for comparison.

Alumina spheres were precalcined at 677° C. for one hour. Two 7433 gram batches of the substrate (with a bulk density of 0.5731 g/cc, a water pore volume of 0.75 cc/g, and a T.V. of 3.66%) were impregnated at full incipient wetness with a mixed solution of 822.5 grams of lanthanum nitrate solution (which has a titer of 0.2870 grams lanthanum oxide per gram of solution) and 1612.1 grams of cerium nitrate (which has a titer of 0.2929 grams ceric oxide per gram of solution used for batch 1), and 1617.0 grams (which has a titer of 0.2918 grams ceric oxide per gram of solution used for batch 2) diluted with deionized water to 5575 milliliters. The pH of the impregnating solutions were 1.98 (batch 1) and 1.90 (batch 2).

The impregnated substrate was dried at 135° C. for 16 hours, followed by calcination at 1010° C. for one hour. The rare earth oxide (nominally 3% lanthanum oxide and 6% ceric oxide) containing support has a bulk density of 0.6506 g/cc, a water pore volume of 0.68 cc/g, and a T.V. of 3.17%.

A 10,696 gram quantity was impregnated at 95% incipient wetness with a palladium solution prepared by combining 332.23 grams of sulfurous acid (6.59 weight percent sulfur dioxie), 86.781 grams palladium nitrate (8.8714% Pd by weight), deionized water, and 11.16 grams dibasic ammonium citrate. Total impregnation volume was 6910 milliliters with a pH of 1.15. The solution was applied by spraying through atomizing nozzles, after which the catalyst was held two hours in the wet state before drying at 135° C. for 16 hours.

The catalyst was reimpregnated with a mixed solution of platinum and palladium. The solution was prepared by combining 72.39 grams of ammonium bisulfite solution (46.8% weight percent), 86,781 grams palladium nitrate (8.8714% Pd by weight), deionized water, and 53.254 grams of a solution of $(NH_4)_6Pt(SO_3)_4$ (9.638% platinum by weight). The total solution volume was 6546 milliliters with a pH of 1.64. The solution was applied by spraying through atomizing nozzles after which the catalyst was held two hours in the wet state prior to drying at 135° C. for 16 hours. The catalyst was then activated at 649° C. for one hour in a flow of 41.3% steam, 2.9% hydrogen, and 55.8% nitrogen.

EXAMPLE 2

This example illustrates a gradient catalyst according to the present invention.

The support base employed contained 1 wt. % of $La_2O_3$ in $Al_2O_3$ and was in the form of spheroidal beads.

The alumina/lanthana beads were heated in air for 2 hours at 260° C. and then cooled to room temperature in a desiccator. The water pore volume of the beads was determined by a standard incipient wetness test.

A cerous nitrate solution with a total volume of 90% of the water pore volume of the amount of support used, an equivalent $CeO_2$ content of 4.43 wt. %, and a pH adjusted to 3.0 (using dilute $NH_4OH$) was prepared. This solution was applied to the beads as a fine spray through a pressure nozzle while the beads were tumbled in a rotating container. The tumbling of beads was continued for an additional 10 minutes. At this point, anhydrous gaseous ammonia was introduced to the tumbling container via a tube. In 10 minutes an amount of ammonia equivalent of 40% of the number of moles of nitrate ion present in the cerous nitrate was delivered. The beads were then dried in air at 135° C. for two hours, and then calcined in air for 1 hour at 871° C. to complete the preparation of the catalyst support.

The catalyst support beads prepared as described above were then converted to the emission control catalyst by application of the noble metals palladium and platinum in two successive impregnations. The solution for the first impregnation was made by combining 287 g of sulfurous acid containing 6.59 wt. % $H_2SO_3$, deionized $H_2O$, 75.0 g palladium nitrate solution containing 8.87 wt. % Pd, and 9.64 g ammonium citrate. This solution was sprayed onto 9,100 g of the support beads, after which the beads were allowed to sit for 2 hours, and then dried at 135° C. A second similar impregnation and drying followed, using a solution containing deionized water, 63.5 g ammonium bisulfite (46.1 wt. % ABS), the same amount of Pd as in the first impregnation, and 46.0 g of a solution containing $(NH_4)_6Pt(SO_3)_4$ at 9.64 wt. % Pt. The total solution volumes were 5,863 ml and 5,555 ml in the two impregnations. The impregnated beads were then treated in an atmosphere of $H_2$, $N_2$ and steam (at 43% steam) at 649° C. for 1 hour.

EXAMPLE 3

Catalysts from Examples 1 and 2 were tested for their Three-Way Catalyst activity via the laboratory activity (TWC sweep) test method described in SAE paper number 800083 by M. V. Ernest and G. Kim entitled "Development of More Active and Durable Automotive Exhaust Catalysts". In order to test the benefits of this novel catalyst with cerium oxide gradient, the catalysts were subjected to thermal treatment at 983° C. for 24 hours in air. The comparative HC, CO, and NO conversions measured at various points (R Values) along the respective sweep curves for catalyst Examples 1 and 2 are summarized in Table I.

RESEARCH & DEVELOPMENT, 1984, 23, 525–531). The abraded layers and remaining core are run through chemical and physical analyses to characterize the catalyst or substrate as a function of weight loss. To determine the promoter oxide content analysis methods such as PIXE (proton induced X-ray emission) or ICP (inductively coupled plasma) can be used. Mathematical models have been developed to further relate the weight losses to actual depths. Thus, the chemical and physical properties are characterized as a function of depth. Since different catalysts or substrates have different rates at which the layers abrade away, this test provides additional information concerning the abrasion rate characteristics (or abrasion resistance). Thus the longer it takes to abrade away the surface layers, the more abrasion resistant is the catalyst or substrate.

A mathematical model was developed that describes these abrasion resistance phenomena in terms of cumu-

TABLE I

| | Three-Way Catalyst Activity* After 24 Hours at 983° C. CONVERSIONS | | | | | | | | | | | | | | |
|---|---|---|---|---|---|---|---|---|---|---|---|---|---|---|---|
| | AT R = 0.75 | | | AT R = 0.85 | | | AT R = 1.00 | | | AT R = 1.15 | | | AT R = 1.50 | | |
| Example | HC | CO | NO | HC | CO | NO | HC | CO | NO | HC | CO | NO | HC | CO | NO |
| 1 | 97 | 84 | 100 | 98 | 91 | 100 | 99 | 99 | 100 | 97 | 99 | 92 | 89 | 98 | 62 |
| 2 | 98 | 91 | 100 | 98 | 95 | 100 | 99 | 99 | 100 | 98 | 100 | 95 | 91 | 100 | 60 |

*Sample charge = 23 cc; GHSV = 33,913 hr$^{-1}$

The data generally show the gradient catalyst of Example 2 to have higher conversions than the non-gradient catalyst in Example 1.

EXAMPLE 4

In addition to the thermal test indicated in Example 3, the catalyst were aged in a pulse flame combustor apparatus. The pulse flame apparatus burns isooctane fuel which has been doped with lead, phosphorus, zinc, and sulfur containing compounds. The catalysts were aged for 45 hours in the pulse flame exhaust at a stoichiometric air/fuel ratio. The aging test involves repetitive cycles at 816° C. for one hour and 871° C. for one-half hour. This is a high space velocity aging test. The TWC sweep data are summarized in Table II.

lative weight loss (and cumulative depth) as a function of cumulative time (t). The following is the equation which was developed for spheroidal type catalysts and substrates.

$$\text{cumulative \% abrasion} = t/(\alpha + \beta t)$$

where
t = cumulative time (in minutes)
α = abrasion resistance (in cumulative minutes/cumulative wt. %)
β = intercept Using the cumulative weight loss data and cumulative times, regression analysis generates a global measure of abrasion resistance (α). Depending on the process under

TABLE II

| | Three-Way Catalyst Activity* After 45 Hours Pulse Flame Aging | | | | | | | | | | | | | | |
|---|---|---|---|---|---|---|---|---|---|---|---|---|---|---|---|
| | AT R = 0.75 | | | AT R = 0.85 | | | AT R = 1.00 | | | AT R = 1.15 | | | AT R = 1.50 | | |
| Example | HC | CO | NO | HC | CO | NO | HC | CO | NO | HC | CO | NO | HC | CO | NO |
| 1 | 16 | 37 | 6 | 22 | 43 | 5 | 36 | 54 | 8 | 52 | 74 | 14 | 63 | 91 | 12 |
| 2 | 20 | 40 | 9 | 29 | 47 | 10 | 43 | 59 | 23 | 57 | 76 | 23 | 64 | 92 | 16 |

*Sample charge = 8.5 cc; GHSV = 91,765 hr$^{-1}$

In general, the gradient catalyst of Example 2 has the higher conversion across the entire sweep curve.

EXAMPLE 5

This example illustrates the attrition resistance of the catalyst according to the present invention and presents a comparison of abrasion resistance as a function of depth.

Figure 1:
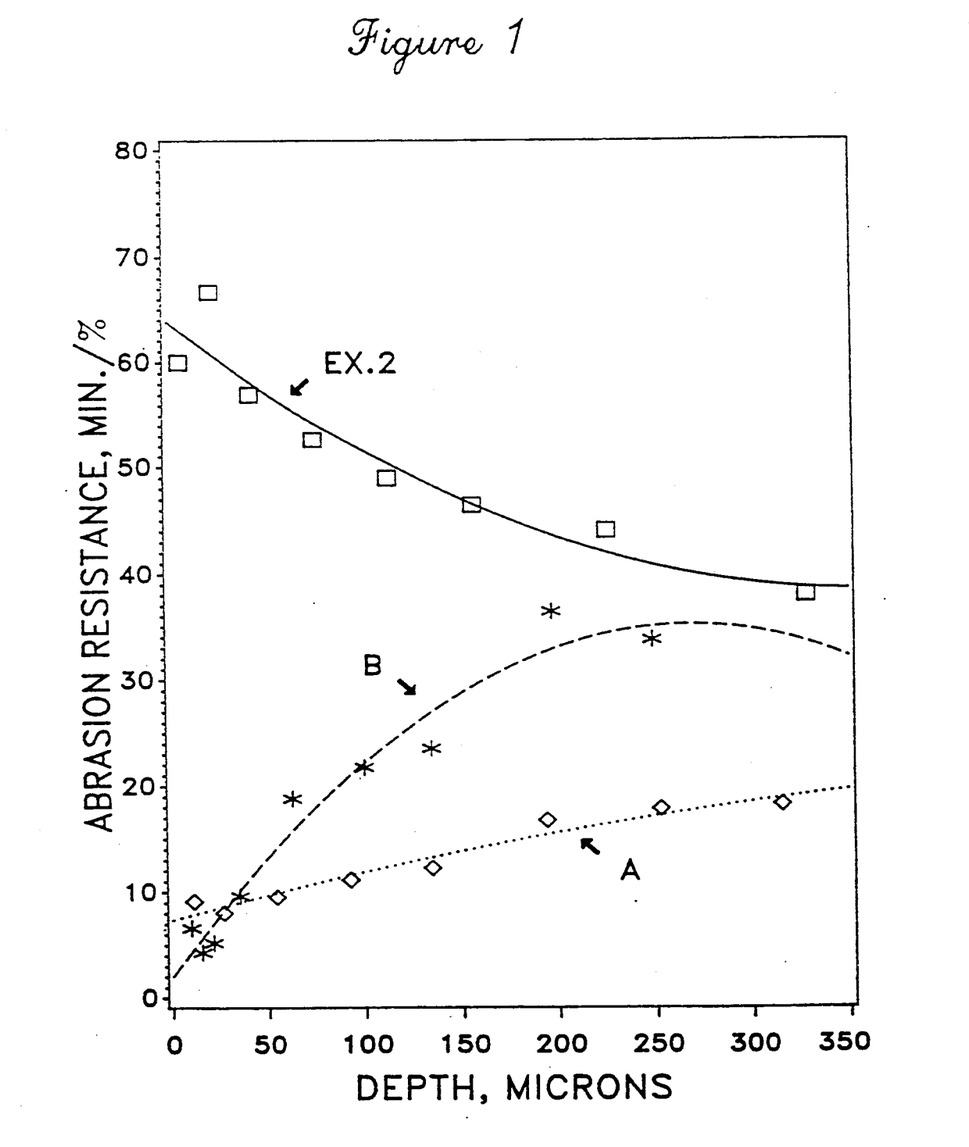
FIG. 1 is a graph of abrasion resistance as a function of the bead depth.

The gradient catalyst from Example 2 was subjected to an attrition test as follows. This attrition test is not a test aimed t characterizing attrition rates per se, but is a procedure aimed at controlled abrasion of the outer surface from a particulate (e.g., sphere, bead, extrusion) for of catalyst or substrate so that it may be analyzed. The procedure is described in some detail in an article by Kim, Ernest, and Montgomery (I&EC PRODUCT which the catalysts and substrates are produced, the global rate, which represents an average value, will vary widely. Some materials have very low abrasion resistances (low α values) at the outer surface, but are found to become more abrasion resistant as more layers are removed. While others are virtually uniform (e.g., constant α) throughout the entire particle. A most desirable characteristic is to have very good abrasion resistance, at the least, on the outer surface. It is most informative to examine the abrasion resistances as a function of depth into the bead. The same cumulative weight loss-cumulative time data (used to compute the global rate) are used to estimate how the abrasion resistances vary with depth. Data of this type are illustrated in FIG. 1. Our invention has resulted in a substrate/catalyst which in fact is much more abrasion resistant (e.g., high α) on the outer surface than in the interior of the bead. This toughening of the surface is clearly a result of developing the gradient of base metal promoters on the outer periphery of the bead. A preferred attrition resistance of the support at the surface of the support or catalyst has an alpha value of at least about 10 where alpha is defined as the abrasion resistance in cumulative minutes per cumulative wt. % and more preferably where the alpha value is at least about 15 at a depth of about 50 microns and at least about 25 at about 100 microns.

Two commercially available catalysts were also analyzed for attrition by the same procedure and their curves labeled A and B are also set forth in FIG. 1. From a comparison of the curves it is seen that the catalyst according to the present invention has a greater abrasion resistance than the commercial catalysts. The abrasion resistance of the outer surface is important because auto exhaust catalysts have a substantial percentage of the metals in that region. At the 10 micron depth, the catalyst of the present invention is approximately 6 times more abrasion resistant (e.g. it takes 6 times longer to remove the same amount of surface) than the commercial catalysts.

Thus the long period of time required to begin to attrit away the catalytic spheres demonstrates the superiority of this catalyst.

EXAMPLE 6

This is an example of the invention in which the catalyst contains platinum, palladium, and rhodium.

An alumina spherical support was prepared according to U.S. Pat. No. 4,179,408. During the preparation of the alumina spheres, a mixture of lanthanum and neodymium nitrates (equivalent to 0.75% and 0.25% of the respective oxides based on the total dry basis weight of the finished support) was included in the sphere making slurry. The dried spheres were thermally activated at 996° C. for one hour resulting in the support material having a bulk density of 0.5247 g/cc, a water pore volume of 0.80 cc/g, a T.V. of 1.26%, and a BET surface area of 130 m²/g.

A quantity consisting of 1050 grams of the above lanthanum/neodymium oxide containing support was impregnated by spraying through atomized nozzles with 220.58 grams of cerous nitrate having a titer of 0.3000 grams ceric oxide per gram of solution diluted to 756 milliliters with deionized water. Half of this impregnated support was exposed to gaseous anhydrous ammonia at 4.105 millimoles/minute flowrate for 10 minutes. After the ammonia treatment, the support was dried at 135° C. and then finally calcined at 941° C. The resultant properties are a bulk density of 0.5758 g/cc, a water pore volume of 0.80 cc/g, and a T.V. of 0.32%. A 240 gram quantity of this support which contains 6% ceric oxide, was impregnated to 95% incipient wetness with a solution prepared by combining 1.1158 grams of palladium nitrate, 0.98 grams of ammonium bisulfate (43.87 weight percent), and 2.565 grams of potassium nitrate and diluting to 173 milliliters with deionized water. After two hours of holding this catalyst in the wet state, the catalyst was dried at 135° C.

The catalyst was then reimpregnated with a mixed solution of hexammonium tetrasulfito platinum (II) and a sulfited rhodium chloride solution. The sulfited rhodium chloride was prepared by heating at 60° C. for two hours a solution of rhodium chloride and sulfurous acid (3 moles $SO_2$ per gram atom of rhodium) at a titer of 2 mg rhodium per milliliter. The platinum and rhodium impregnating solution was prepared by mixing 2.5612 grams of platinum solution (which has a titer of 9.6376 weight percent) with 18.91 grams of the sulfited rhodium solution (1.63158 mg rhodium per gram solution) and diluting to 163 milliliters with deionized water. The solution was applied by spraying through atomizing nozzles. The catalyst was allowed to stand in the wet state for two hours after which it was dried at 135° C. for 16 hours. The catalyst was reduced in 30% steam, 3.5% hydrogen, and 66.5 nitrogen at 649° C. for one hour.

EXAMPLE 7

This catalyst provides a non-gradient comparison sample prepared identically to Example 6 except that in the case of the ceria addition step the support was not exposed to ammonia.

The remaining half of the cerium impregnated support (described above in Example 6) was dried at 135° C., then calcined at 941° C. for one hour. This support had a bulk density of 0.5800 g/cc, a water pore volume of 0.80 cc/g, and a TV of 0.34%. A 240 gram quantity of this support which contains 6% ceric oxide, was impregnated to 95% incipient wetness with a solution prepared by combining 1.1077 grams of palladium nitrate, 0.98 grams of ammonium bisulfate (43.87 weight percent), and 2.565 grams of potassium nitrate and diluting to 173 milliliters with deionized water. After two hours of holding this catalyst in the wet state, the catalyst was dried at 135° C. The catalyst was then reimpregnated with a mixed solution of hexammonium tetrasulfito platinum (II) and a sulfited rhodium chloride solution. The sulfited rhodium chloride was prepared by heating at 60° C. for two hours a solution of rhodium chloride and sulfurous acid (3 moles $SO_2$ per gram atom of rhodium) at a titer of 2 mg rhodium per milliliter. The platinum and rhodium impregnating solution was prepared by mixing 2.5426 grams of platinum solution (which has a titer of 9.6376 weight percent) with 18.77 grams of the sulfited rhodium solution (1.63158 mg rhodium per gram solution) and diluting to 163 milliliters with deionized water. The solution was applied by spraying through atomizing nozzles. The catalyst was allowed to stand in the wet state for two hours after which it was dried at 135° C. for 16 hours. The catalyst was reduced in 30% steam, 3.5% hydrogen, and 66.5% nitrogen at 649° C. for one hour.

EXAMPLE 8

Catalysts in Examples 6 and 7 were pulse flame aged 45 and 90 hours and tested for TWC sweep activity after each aging period. The aging was carried out as described earlier in Example 4. The results are set forth in Table III.

TABLE III

Three-Way Catalyst Activity* After 45 and 90 Hours Pulse Flame Aging

| CONVERSIONS AFTER 45 HOURS PULSE FLAME AGING | | | | |
|---|---|---|---|---|
| AT R = 0.75 | AT R = 0.85 | AT R = 1.00 | AT R = 1.15 | AT R = 1.50 |

TABLE III-continued

Three-Way Catalyst Activity* After 45 and 90
Hours Pulse Flame Aging

| Example | HC | CO | NO | HC | CO | NO | HC | CO | NO | HC | CO | NO | HC | CO | NO |
|---|---|---|---|---|---|---|---|---|---|---|---|---|---|---|---|
| 6 | 68 | 58 | 97 | 75 | 72 | 96 | 79 | 86 | 94 | 80 | 95 | 83 | 73 | 96 | 50 |
| 7 | 61 | 59 | 93 | 67 | 70 | 91 | 71 | 84 | 88 | 73 | 92 | 78 | 70 | 95 | 48 |

CONVERSIONS AFTER 90 HOURS PULSE FLAME AGING

| | AT R = 0.75 | | | AT R = 0.85 | | | AT R = 1.00 | | | AT R = 1.15 | | | AT R = 1.50 | | |
|---|---|---|---|---|---|---|---|---|---|---|---|---|---|---|---|
| Example | HC | CO | NO | HC | CO | NO | HC | CO | NO | HC | CO | NO | HC | CO | NO |
| 6 | 53 | 60 | 84 | 58 | 69 | 82 | 62 | 80 | 78 | 63 | 88 | 63 | 62 | 92 | 34 |
| 7 | 15 | 33 | 15 | 21 | 38 | 18 | 33 | 50 | 30 | 48 | 71 | 44 | 62 | 90 | 36 |

*Sample charge = 8.5 cc; GHSV = 91,765 hr$^{-1}$

Note, that at 45 hours the gradient catalyst of Example 6 exhibits a clear advantage over the non-gradient catalyst of Example 7 over the entire sweep. The effect becomes even more pronounced as the aging time is continued to 90 hours. The rich-side activity (e.g., at R less than 1) is clearly improved by the existence of the ceria gradient.

EXAMPLE 9

Figure 2:
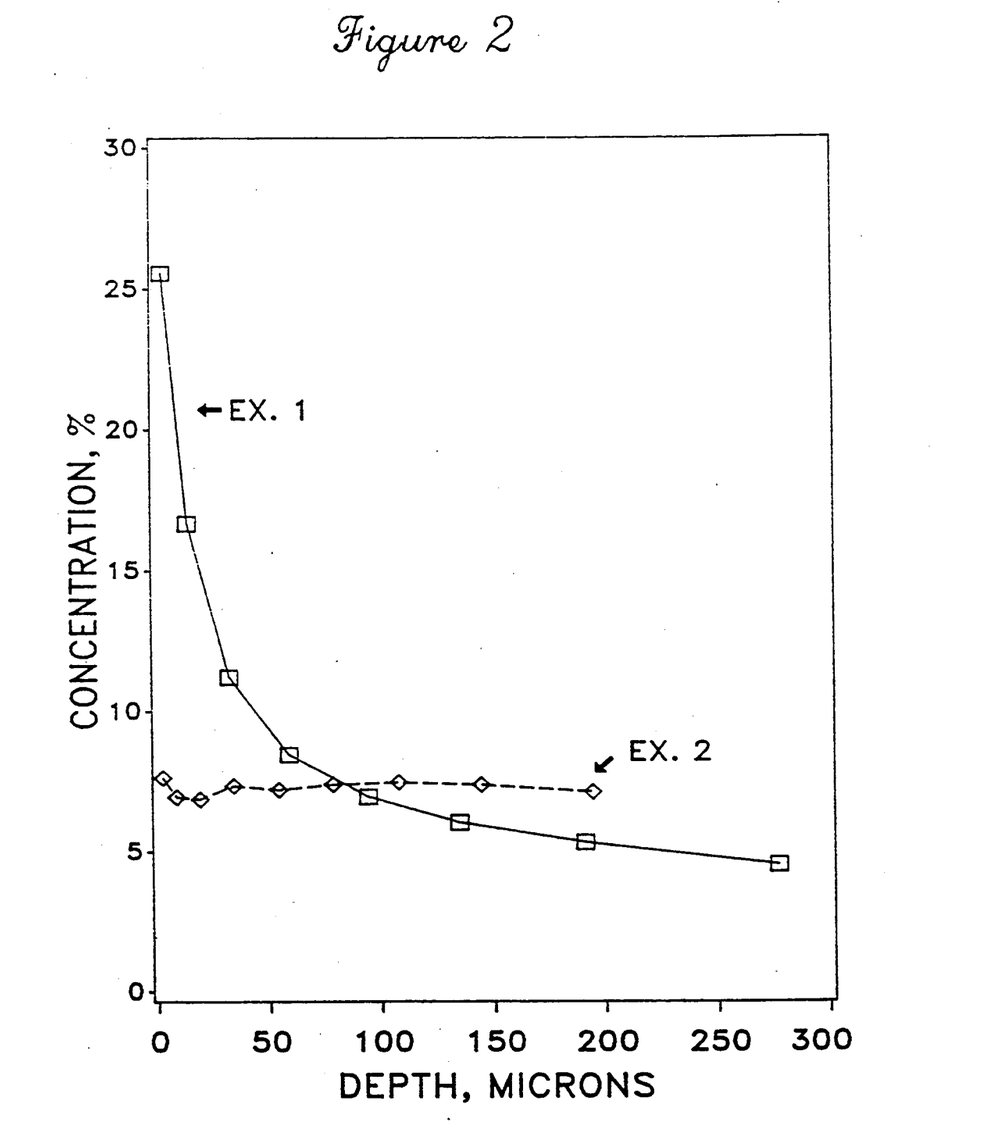
FIG. 2 is a graph of the ceria concentration as a function of bead depth.

To illustrate how the ceria concentration is controlled compared to a conventional non-gradient catalyst, FIG. 2 shows the ceria distribution of catalyst of Example 1 (non-gradient) and 2 (gradient). Note, that the ceria concentration at the surface of catalyst of Example 2 is more than 4 times that of the overall bulk concentration.

EXAMPLE 10

This example illustrates a radial gradient in ceria concentration in support spheres, and demonstrates the ability to control steepness of the gradient via the NH3/NO3 stoichiometry.

The rare earth oxide composition is the same as indicated in Example 6. In this example the ceria (6 weight %) is co-applied with the lanthanum/neodymium oxide (1 weight % having 75/25 weight ratio) stabilizer. Two levels of NH3/NO3 (molar basis) were examined. The levels were 0.1 (sample L) and 0.4 (sample H) meaning that for each mole of nitrate ion in the cerium nitrate impregnating solution, either 0.1 or 0.4 mole of ammonia gas was used to contact the impregnated beads. After the ammonia exposure following the procedure of Example 6, the beads were dried, and activated.

Figure 3:
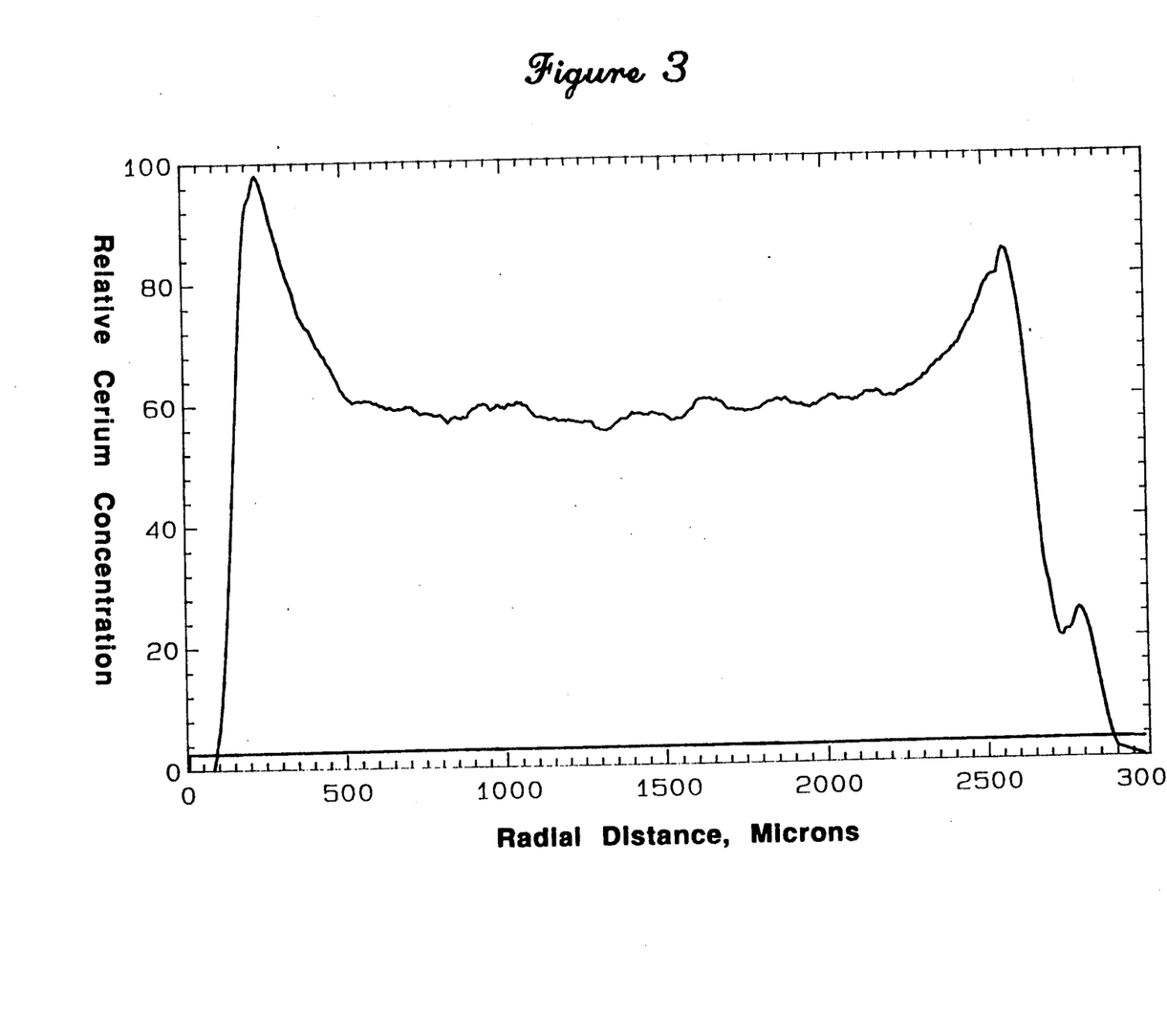
FIG. 3 is a graph of the relative cerium concentration as a function of the radial distances at one level of ammonia concentration.
Figure 4:
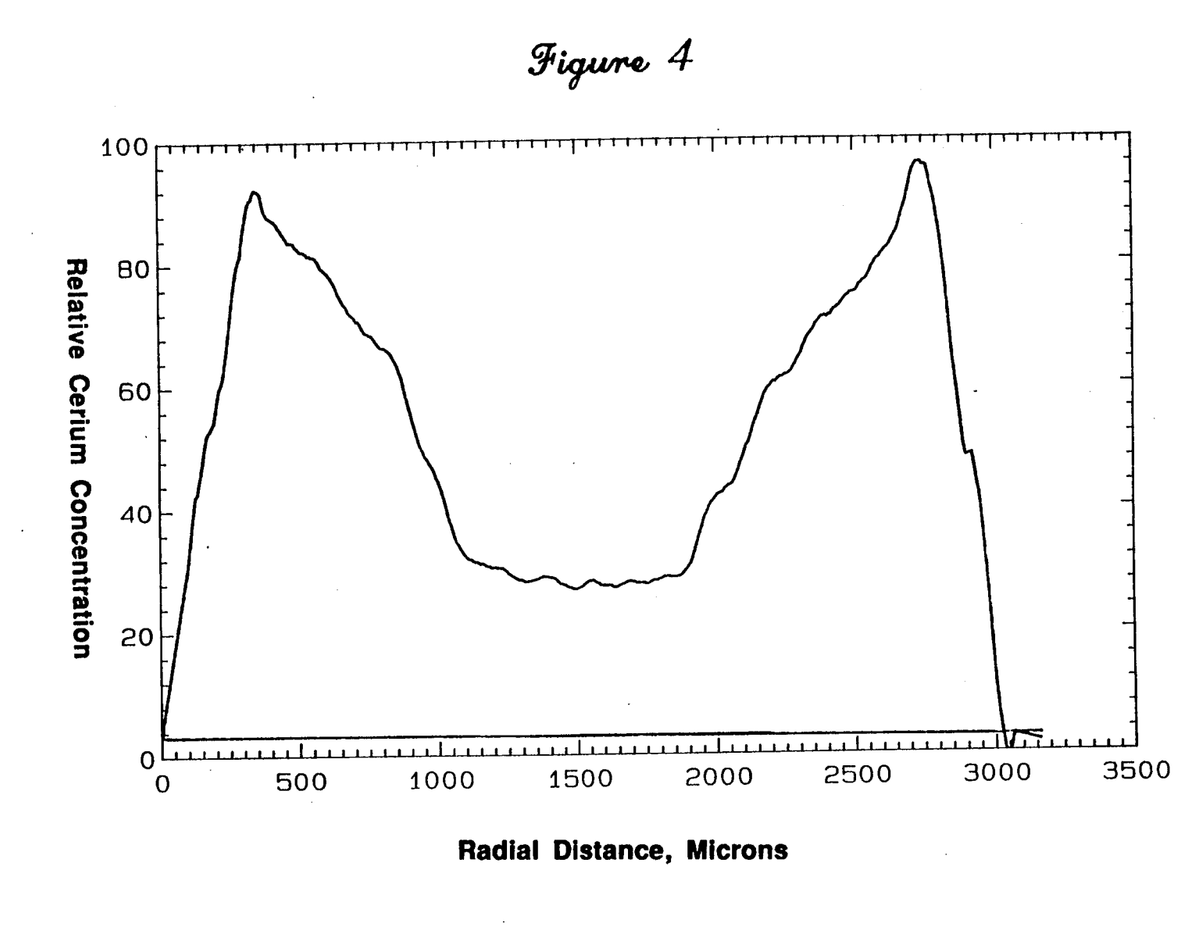
FIG. 4 is a graph of the relative cerium concentration as a function of the radial distances at another level of ammonia concentration.

A number of beads were selected at random from samples L and H. The beads were prepared for electron microprobe analysis as follows. The beads were mounted in an epoxy resin which when hardened immobilizes the beads. A cross-section through the bead was cut and the exposed surface was polished to a ¼ micron finish. The polished surface was then carbon coated to provide a conductive surface for the electron beam. The results are summarized in FIG. 3 (sample L) and FIG. 4 (sample H). Realizing that information from a small number of beads provides only a limited representation of the overall population, one should look at the data from a qualitative perspective. The information provided in FIGS. 3 and 4 are averaged scans from six different beads from samples L and H respectively. Note, that in FIG. 3 (sample L with NH3/NO3=0.1) the gradient appears to be less pronounced than the gradient in FIG. 4 (sample H with NH3/NO3=0.4). Layer abrasion analysis on sample L revealed that the surface concentration of cerium oxide was nearly twice that of the overall bulk concentration.

This example demonstrates that the higher the NH3/NO3 proportions (or more generally, NH3 to conjugate anion proportions), the sharper the cerium oxide (or more generally catalytic promoter) gradient.

It is understood that the foregoing detailed description is given merely by way of illustration and that many variations may be made therein without departing from the spirit of this invention.

What is claimed is:

1. A formed refractory oxide support impregnated with a catalytic promoter oxide selected from the group consisting of CeO$_2$, ZrO$_2$, HfO$_2$, TiO$_2$, SiO$_2$, rare earth oxide, alkaline earth oxide, Nb$_2$O$_5$, and mixtures thereof and distributed with a concentration gradient such that the highest concentration of the catalytic promoter oxide is at or near the outer surface and the lowest concentration is at or near the center; said gradient of catalytic promoter oxide being characterized further exhibiting a relative decrease in concentration of at least about 25 % from the surface to about 50 microns below the surface.

2. A refractory oxide support according to claim 1, wherein the catalytic promoter oxide is characterized as exhibiting a relative decrease in concentration of at least about 35 % from the surface to about 50 microns below the surface.

3. A refractory oxide support according to claim 2, wherein the catalytic promoter oxide is further characterized as exhibiting a relative decrease in concentration of at least about 45 % from the surface to about 100 microns below the surface.

4. A refractory oxide support according to claim 1, wherein the formed support is spheroidal.

5. A refractory oxide support according to claim 1, further having 0.1-5 % by weight lanthana uniformly deposited on the support.

6. A refractory oxide support according to claim 1, wherein the formed support is at least about 20 U.S. mesh designation in size but less than about ½ U. S. mesh designation in size.

7. A refractory oxide support according to claim 6, wherein the formed support is at least about 10 U.S. mesh designation in size but less than about 5 U. S. mesh designation in size.

8. A refractory oxide support according to claim 1, wherein the refractory oxide is alumina.

9. A refractory oxide support according to claim 1, wherein the total amount of catalytic promoter oxide deposited is between about 0.5 to 20% of the promoter oxide and support.

10. A refractory oxide support according to claim 1, wherein said catalytic promoter oxide is ceria.

11. A refractory oxide support according to claim 1, wherein said catalytic promoter oxide is zirconia.

12. A refractory oxide support according to claim 1, wherein said catalytic promoter oxide is silica for non-siliceous refractory oxides.

13. A refractory oxide support according to claim 1, wherein the attrition resistance of the support at the surface of the support or catalyst has an alpha value of at least about 10 and where alpha is defined as the abrasion resistance in cumulative minutes per cumulative wt. %

14. A refractory oxide support according to claim 1, wherein the alpha value is at least about 15 at a depth of about 50 microns and at least about 25 at about 100 microns.

15. An improved automotive exhaust catalyst comprising a refractory oxide form support according to claim 1 and further comprising a catalytically effective amount of at least one platinum group metal having a metal ingredient.

16. An improved automotive exhaust catalyst according to claim 15, further having 0.1–5 % by weight lanthana uniformly deposited on the support.

17. An improved automotive exhaust catalyst according to claim 15, wherein said catalytic promoter oxide is ceria.

18. A method of impregnating a formed refractory oxide support with a catalytic promoter oxide to produce a catalytic promoter oxide radial concentration gradient comprising the steps:
 a) impregnating the formed refractory oxide support with a solution of a soluble catalytic promoter oxide precursor to the extent of less than full incipient wetness;
 b) treating the impregnated support while tumbling with a gaseous base to cause the hydrous catalytic promoter oxide precursor to deposit in the form of a radial concentration gradient such that the highest concentration of the catalytic promoter oxide is at or near the outer surface and the lowest concentration is at or near the center;
 c) drying and calcining the support from step (B) to convert the catalytic promoter oxide precursor into the catalytic promoter oxide.

19. The method according to claim 18, wherein the catalytic promoter oxide precursor is cerous nitrate.

20. The method according to claim 18, wherein the gaseous base is ammonia.

* * * * *